(12) United States Patent
Durfee

(10) Patent No.: US 10,058,929 B2
(45) Date of Patent: Aug. 28, 2018

(54) STEP DRILL BIT WITH VARIABLE HELICAL FLUTE

(71) Applicant: IRWIN INDUSTRIAL TOOL COMAPNY, Huntersville, NC (US)

(72) Inventor: LaVerne R. Durfee, Harmony, NC (US)

(73) Assignee: IRWIN INDUSTRIAL TOOL COMPANY, Huntersville, NC (US)

(*) Notice: Subject to any disclaimer, the term of this patent is extended or adjusted under 35 U.S.C. 154(b) by 0 days.

(21) Appl. No.: 15/341,506

(22) Filed: Nov. 2, 2016

(65) Prior Publication Data
US 2017/0129022 A1    May 11, 2017

Related U.S. Application Data

(60) Provisional application No. 62/253,410, filed on Nov. 10, 2015.

(51) Int. Cl.
*B23B 51/00* (2006.01)

(52) U.S. Cl.
CPC ...... *B23B 51/009* (2013.01); *B23B 2251/046* (2013.01); *B23B 2251/282* (2013.01); *B23B 2251/408* (2013.01); *Y10T 408/906* (2015.01)

(58) Field of Classification Search
CPC ............ B23B 51/009; B23B 2251/046; B23B 2251/282; B23B 2251/406; B23B 2251/408; Y10T 408/906
See application file for complete search history.

(56) References Cited

U.S. PATENT DOCUMENTS

| 716,557 | A | * | 12/1902 | Klingensmith | ........ | B27G 15/00 |
| | | | | | | 408/214 |
| 2,897,696 | A | * | 8/1959 | Tisserant | .............. | B23B 51/009 |
| | | | | | | 408/225 |
| 3,564,945 | A | * | 2/1971 | Bradley | ................ | B23B 51/009 |
| | | | | | | 408/224 |

(Continued)

FOREIGN PATENT DOCUMENTS

| DE | 9414659 U1 | * | 11/1994 | ........... B23B 51/009 |
| DE | 19526686 A1 | * | 3/1996 | ........... B23B 51/009 |

(Continued)

OTHER PUBLICATIONS

Quanz, Reiner, Machine Translation of DE 200 04 523 U1, patent published Sep. 21, 2000.*

*Primary Examiner* — Eric A Gates
(74) *Attorney, Agent, or Firm* — Eversheds Sutherland (US) LLP

(57) ABSTRACT

A step drill bit can include a cutting head defining a longitudinal axis and multiple steps having different effective diameters. First and second cutting edges can be formed in the cutting head. The first cutting edge and the second cutting edge can be arranged such that the bit is asymmetric in a plane perpendicular to the longitudinal axis relative to a plane containing the longitudinal axis. The step drill bit can further include one or more flutes. Each flute can define a groove in the cutting head that extends along a helical path about the longitudinal axis. Each flute can have a variable helix angle such that the angle of the helix about the longitudinal axis changes at one or more points along the length of the flute.

12 Claims, 6 Drawing Sheets

(56) References Cited

U.S. PATENT DOCUMENTS

| | | | | |
|---|---|---|---|---|
| 3,758,222 | A * | 9/1973 | Oakes | B23B 51/009 408/224 |
| 4,582,458 | A * | 4/1986 | Korb | B23B 51/009 408/224 |
| 5,466,100 | A * | 11/1995 | Ahluwalia | B23B 31/005 408/224 |
| 6,890,133 | B2 * | 5/2005 | Singh | B23B 51/009 408/224 |
| 8,029,215 | B2 * | 10/2011 | Gentry | B23B 51/009 408/224 |
| 2006/0093448 | A1 * | 5/2006 | Kelsey | B23B 51/009 408/224 |
| 2012/0195704 | A1 * | 8/2012 | White | B23B 51/0081 408/224 |
| 2014/0023445 | A1 * | 1/2014 | Allen | B23B 51/009 408/144 |
| 2014/0363244 | A1 * | 12/2014 | Allen | B23B 51/009 408/16 |
| 2014/0369776 | A1 * | 12/2014 | Durfee | B23B 51/009 408/224 |

FOREIGN PATENT DOCUMENTS

| | | | | | |
|---|---|---|---|---|---|
| DE | 20004523 | U1 * | 8/2000 | | B23B 51/009 |
| DE | 20303656 | U1 * | 5/2003 | | B23B 51/009 |
| DE | 20318529 | U1 * | 4/2005 | | B23B 51/009 |
| DE | 202011106232 | U1 * | 11/2011 | | B23B 51/009 |
| FR | 725505 | A * | 5/1932 | | B23B 51/009 |
| FR | 1080865 | A * | 12/1954 | | B23B 51/009 |
| GB | 995043 | A * | 6/1965 | | B23B 51/009 |
| JP | 63016912 | A * | 1/1988 | | |
| JP | 07156007 | A * | 6/1995 | | |
| JP | 11239907 | A * | 9/1999 | | |

* cited by examiner

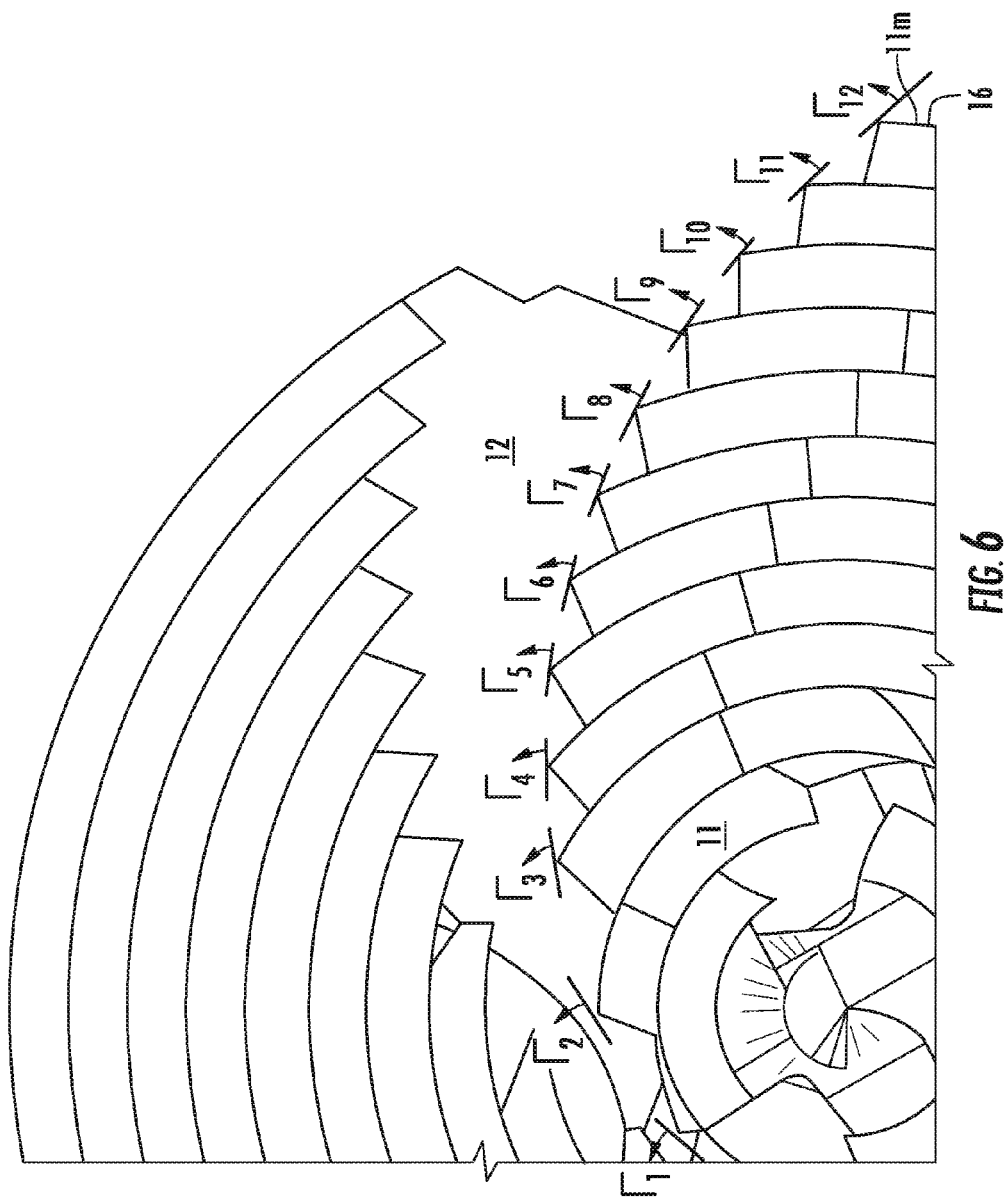

STEP DRILL BIT WITH VARIABLE HELICAL FLUTE

RELATED APPLICATIONS

This application claims priority under 35 U.S.C. § 119 to U.S. Provisional Patent Application No. 62/253,410 filed Nov. 10, 2015, and titled "Step Drill Bit with Variable Helical Flute," the entire contents of which are hereby incorporated herein by reference for all purposes.

TECHNICAL FIELD

The present disclosure is generally related to drill bits and more particularly to a step drill bits having one or more helical flutes.

BACKGROUND

A step drill bit typically includes a series of graduated steps that permit the drilling of multiple different sized holes without changing the bit. In certain embodiments, step drill bits can be configured for use with power drills and may be used on all materials, including wood, plastic, composite, and metallic materials. Certain conventional step drill bits include a flute. The flute is a deep groove that separates one portion of the outer edge of the step from another portion, creates a cutting edge, provides a passageway that gives waste material (e.g., chips or dust particles caused during the cutting operation) a path out of the hole being drilled, and establishes the rake angle for the cutting edge. Without a flute, the bit would not cut and the waste material would need to be removed before drilling could continue.

Flutes on conventional step drill bits are typically straight, in parallel with the longitudinal axis of the particular step drill bit. In certain other conventional step drill bits, the flute has a constant angular helical pattern about the longitudinal axis of the particular step drill bit. Unfortunately, having a constant angular helical pattern creates deficiencies either with the cutting ability of the smaller diameter steps or the control of the larger diameter steps.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows:

FIG. 6 is a partial sectional end view of the first end of the step drill bit in accordance with one example embodiment of the disclosure.

DETAILED DESCRIPTION OF THE EXEMPLARY EMBODIMENTS

Figure 1:
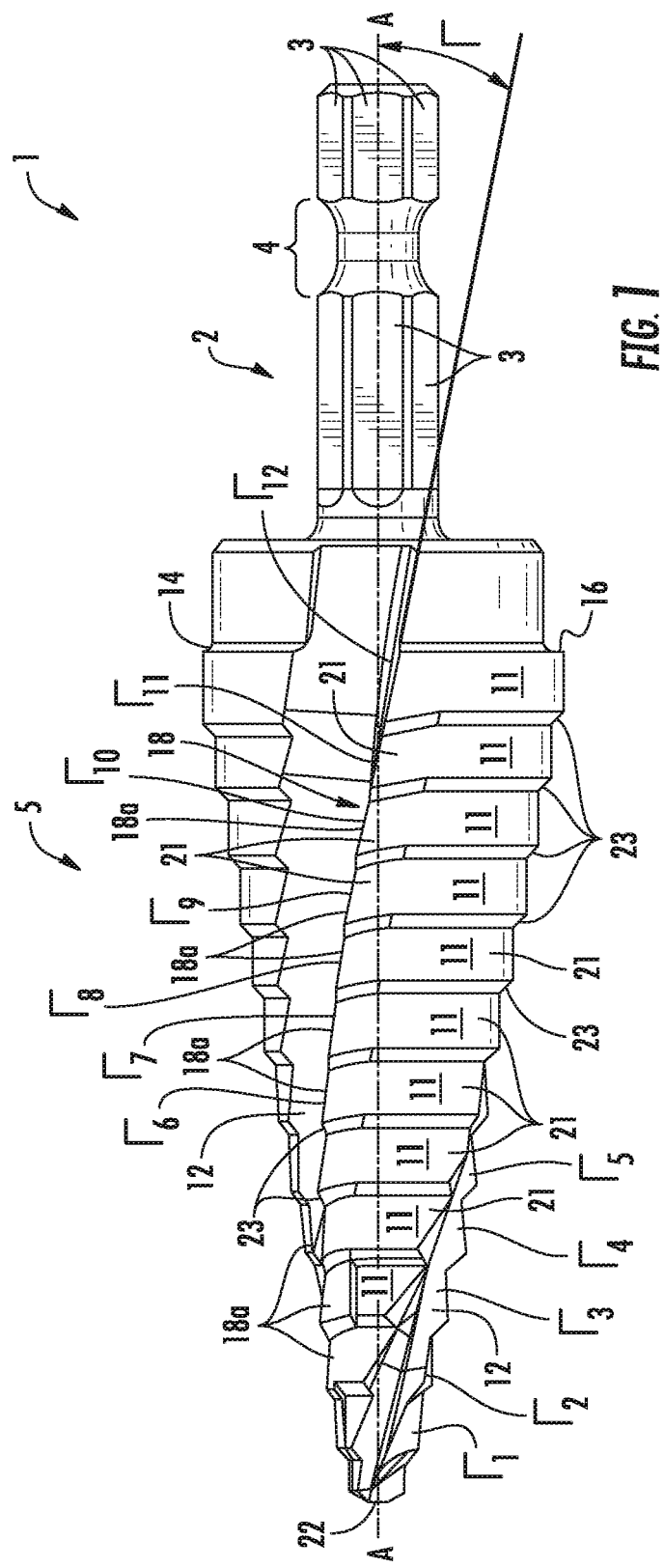
FIG. 1 is a perspective view of a step drill bit in accordance with one example embodiment of the disclosure.

Example embodiments will now be described more fully hereinafter with reference to the accompanying drawings, in which example embodiments are shown. The claimed elements may, however, be embodied in many different forms and should not be construed as limited to the exemplary embodiments set forth herein; rather, these embodiments are provided so that this disclosure will be thorough and complete, and will fully convey the scope of the concept to those of ordinary skill in the art. Like reference numbers refer to like, but not necessarily the same or identical, elements throughout.

Certain dimensions and features of the example step drill bit are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the step drill bit and between features of the step drill bit are described herein using the term "substantially." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions.

As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

FIG. 1 is a perspective view of a step drill bit 1 in accordance with one example embodiment of the disclosure. Referring now to FIG. 1, the example step drill bit 1 can include a multitude of variable diameter steps that may typically be used to drill holes through relatively thin-walled materials such as, for example, metal, wood, plastic, composites, etc. However, the step drill bit 1 may also be used to drill holes in these or other materials having thick or thin walls. The example step drill bit 1 disclosed herein is able to drill many different diameter holes. For example, each step has a diameter where the step is dimensioned to cut a hole of a predetermined diameter in a relatively thin-walled member. These steps can be configured such that the steps increase in diameter from the leading end (near 21) of the bit 1 toward the trailing end of the bit 1. The number of steps on the example drill bit 1 can range anywhere between 3-20 in certain example embodiments of the disclosure.

In one example embodiment, the step drill bit 1 includes a shaft or shank 2 that is configured to be removably connected to the chuck of a rotary tool, such as a hand-held or stationary power drill or the like. In certain example embodiments, the shaft or shank 2 may include two or more flat faces 3 that may be received in the chuck of a rotary tool. In some example embodiments the chuck of the rotary tool includes movable jaws that engage the flat faces 3 of the shank 2 such that the bit rotates with the chuck upon actuation of the rotary tool. In addition or alternatively, in certain example embodiments, the shank 2 may include a quick connect coupler 4, such as a transverse groove or one or more detents, that receives a mating tang on the quick connect coupler of the rotary tool. In alternate example embodiments, other connectors may be provided along the shaft or shank 2 for connecting the step drill bit 1 to a rotary tool.

The shaft or shank 2 of the step drill bit 1 can be connected to a cutting portion or head 5 that includes the step drill configuration. In certain example embodiments, the shank 2 and cutting portion 5 can be integrally formed as one-piece and out of the same material. In other example embodiments, the shank 2 and cutting portion 5, or portions of the cutting portion 5 such as the cutting edges and/or cutting tip, can be formed of separate elements, and can be made of different materials connected together to form the step drill bit 1. In one example embodiment, the materials may be selected to have different properties where, for example, the cutting portion 5, or portions of the cutting portion 5 such as the cutting edges and/or cutting tip, may be formed of a harder material than the remainder of the step drill bit 1. The different portions of the step drill bit 1 may be secured together to make a step drill bit 1 where the different portions of the step drill bit 1 are connected together such as by welding, brazing or the like to permanently secure the components together. In other example embodiments, different portions of the step drill bit 1 (such as a cutting edge) may be removably coupled such that the different portions of the step drill bit 1 may be disconnected from one another and removed and replaced during normal use of the step drill bit 1.

In the example embodiment of FIG. 1, the cutting portion 5 is formed with twelve steps 8. However, this is for example only, as a greater or fewer number of steps 8 may be provided on the step drill bit 1. In certain example embodiments, the cutting portion 5 can include or otherwise be formed with two flutes 12 that can extend generally along the longitudinal axis A-A of the step drill bit 1. In certain example embodiments, the longitudinal axis A-A of the step drill bit 1 can be the axis of rotation of the step drill bit 1 during use. While the example embodiment of FIG. 1 includes two flutes 12, this is for example purposes only, as one flute or a greater number of flutes 12 (e.g., between 3-6 flutes) may be included in alternate example embodiments.

Referring to FIG. 6, in certain example embodiments, each of the one or more flutes 12 included in the step drill bit 1 can be formed at a helix angle (Γ) relative to the longitudinal axis A-A of the step drill bit 1 at helix locations Γ1 through Γ12 on FIG. 6. In certain example embodiments, the helix angle (Γ) of the flute 12 at each step 8 decreases from the distal end or point 22 to the shank 2. In one example, the helix angle (Γ) decreases at a constant or substantially constant rate along the length of respective flute 12. In example embodiments where the step drill bit 1 has a smaller last step section 10m, 11m diameter step, the helix angle (Γ1), near the distal end or point 22, can be anywhere in the range of approximately 20 degrees to approximately 40 degrees and the helix angle (Γ12), near the last step section 10m, 11m, can be anywhere in the range of approximately 10 degrees to approximately 22 degrees. Accordingly, in one example embodiment, the helix angles can be anywhere within the ranges as follows Γ1=approximately 20 degrees to approximately 40 degrees; Γ2=approximately 19.1 degrees to approximately 38.4 degrees; Γ3=approximately 18.2 degrees to approximately 36.8 degrees; Γ4=approximately 17.3 degrees to approximately 35.2 degrees; Γ5=approximately 16.4 degrees to approximately 33.6 degrees; Γ6=approximately 15.5 degrees to approximately 32 degrees; Γ7=approximately 14.6 degrees to approximately 30.4 degrees; Γ8=approximately 13.7 degrees to approximately 28.8 degrees; Γ9=approximately 12.8 degrees to approximately 27.1 degrees; Γ10=approximately 11.9 degrees to approximately 25.4 degrees; Γ11=approximately 11 degrees to approximately 23.7 degrees; and Γ12=approximately 10 degrees to approximately 22 degrees and will be such that Γ1>Γ2>Γ3>Γ4>Γ5>Γ6>Γ7>Γ8>Γ9>Γ10>Γ11>Γ12.

In other example embodiments where the step drill bit 1 has a larger last step section 10m, 11m diameter step, the helix angle (Γ1), near the distal end or point 22, can be anywhere in the range of approximately 20 degrees to approximately 30 degrees and the helix angle (Γ12), near the last step section 10m, 11m, can be anywhere in the range of approximately 0 degrees to approximately 20 degrees. Accordingly, in one example embodiment, the helix angles can be anywhere within the ranges as follows Γ1=approximately 20 degrees to approximately 30 degrees; Γ2=approximately 18.18 degrees to approximately 29.1 degrees; 13=approximately 16.36 degrees to approximately 28.8 degrees; Γ4=approximately 14.54 degrees to approximately 27.3 degrees; 15=approximately 12.72 degrees to approximately 26.4 degrees; Γ6=approximately 10.9 degrees to approximately 25.5 degrees; Γ7=approximately 9.08 degrees to approximately 24.6 degrees; 18=approximately 7.26 degrees to approximately 23.7 degrees; Γ9=approximately 5.44 degrees to approximately 22.8 degrees; Γ10=approximately 3.62 degrees to approximately 21.9 degrees; Γ11=approximately 1.82 degrees to approximately 21 degrees; and Γ12=approximately 0 degrees to approximately 20 degrees and will be such that Γ1>Γ2>Γ3>Γ4>Γ5>Γ6>Γ7>Γ8>Γ9>Γ10>Γ11>Γ12.

While the example embodiment above is for a twelve step drill bit 1, those of ordinary skill in the art will recognize that the same concept can be applied to a step drill bit having greater or fewer steps 8. In certain example embodiments the helix angle adjacent each step 8 can be generally determined according to the following function: $(((\Gamma N-\Gamma 1)/(N-1))*X)+\Gamma 1$, where N is the total number of steps, Γ1 is the helix angle at the first step 8 adjacent the distal end 22, and X is the particular step 8 up from the distal end 22.

In one example embodiment, the step drill bit 1 can have two flutes 12 with constantly or substantially constantly reducing helix angles (Γ), where the helix angle (Γ1) for each flute 12, near the distal end or point 22, can be anywhere within the range of approximately 19 degrees to approximately 29 degrees and preferably between approximately 21 degrees to approximately 27 degrees and more preferably about 24 degrees and the helix angle (Γ12), near the last step section 10m, 11m, can be anywhere within the range of approximately 7 degrees to approximately 17 degrees and preferably between approximately 9 degrees to approximately 15 degrees and more preferably approximately 12 degrees. Accordingly, in one example embodiment, the helix angles for the two flutes can be anywhere within the ranges as follows Γ1=approximately 29 degrees to approximately 19 degrees and preferably approximately 24 degrees; Γ2=approximately 27.9 degrees to approximately 17.9 degrees and preferably approximately 22.9 degrees; Γ3=approximately 26.8 degrees to approximately 16.8 degrees and preferably approximately 21.8 degrees; Γ4=approximately 25.7 degrees to approximately 15.7 degrees and preferably approximately 20.7 degrees; Γ5=approximately 24.6 degrees to approximately 14.6 degrees and preferably approximately 19.6 degrees; Γ6=approximately 23.5 degrees to approximately 13.5 degrees and preferably approximately 18.5 degrees; Γ7=approximately 22.4 degrees to approximately 12.4 degrees and preferably approximately 17.4 degrees; Γ8=approximately 21.3 degrees to approximately 11.3 degrees and preferably approximately 16.3 degrees; Γ9=approximately 20.2 degrees to approximately 10.2 degrees and preferably approximately 15.2 degrees; Γ10=approximately 19.1 degrees to approximately 9.1 degrees and preferably approximately 14.1 degrees; Γ11=approximately 18 degrees to approximately 8 degrees and preferably approximately 13 degrees; and Γ12=approximately 17 degrees to approximately 7 degrees, and preferably approximately 12 degrees and will be such that Γ1>Γ2>Γ3>Γ4>Γ5>Γ6>Γ7>Γ8>Γ9>Γ10>Γ11>Γ12. While the example embodiment above is for a twelve step drill bit 1, those of ordinary skill in the art will recognize that the same concept can be applied to a step drill bit having greater or fewer steps 8 and the helix angle can be generally determined at each step 8 according to the following function: $(((\Gamma N - \Gamma 1)/(N-1))*X) + \Gamma 1$, where N is the total number of steps 8, Γ1 is the helix angle at the first step 8 adjacent the distal end 22, and X is the particular step 8 up from the distal end 22.

FIG. 6 also presents an example embodiment where the change of the helix angle for each of the flutes 12 is shown as represented by helix angles Γ1-Γ12. As discussed above, in one example, the helix angle (Γ) decreases from the distal end or point 22 to the shank 2 at a constant or substantially constant rate along the length of respective flute 12 such that Γ1>Γ2>Γ3>Γ4>Γ5>Γ6>Γ7>Γ8>Γ9>Γ10>Γ11>Γ12.

In another example embodiment, each flute 12 may include a first portion positioned generally closer to the distal end or point 22 having a first helix angle (Γ) that is constant or substantially constant, a second portion positioned at and/or generally closer to the last step section 10m, 11m that has a second helix angle (Γ) that is constant or substantially constant and that is less than the first helix angle and a third portion disposed between the first portion and the second portion of the respective flute that has a variable helix angle that decreases from the first helix angle to the second helix angle such that Γ1=Γ2=Γ3>Γ4>Γ5>Γ6>Γ7>Γ8>Γ9=Γ10=Γ11=Γ12. While the example embodiment is described with regard to a step drill bit having twelve steps 8, the same concept could be applied to step drill bits having greater or fewer steps 8 in other example embodiments. Further, the length of each of the first, second and third portions could each individually be greater or lesser than as described to extend along a greater or fewer number of steps 8 than as described above.

In another example embodiment, each flute 12 may include a first portion positioned generally closer to the distal end or point 22 having a first range of helix angles (Γ) that is variable and decreasing at a constant or substantially constant rate, a second portion positioned at and/or generally closer to the last step section 10m, 11m that has a second range of helix angles (Γ) that is variable and decreasing at a constant or substantially constant rate and each of the second range of helix angles is less than each of the first range of helix angles and a third portion disposed between the first portion and the second portion of the respective flute 12 that has a constant or substantially constant helix angle (Γ) that is less than at least a portion of the first range of helix angles and is greater than at least a portion of the second range of helix angles, such that Γ1>Γ2>Γ3>Γ4>Γ5=Γ6=Γ7=Γ8>Γ9>Γ10>Γ11>Γ12. While the example embodiment is described with regard to a step drill bit having twelve steps 8, the same concept could be applied to step drill bits having greater or fewer steps 8 in other example embodiments. Further, the length of each of the first, second and third portions could each individually be greater or lesser than as described to extend along a greater or fewer number of steps 8 than as described above.

Each of these embodiments described above with regard to the variable helix angle are provided for example only and each can be modified or combined to change the rate of change in the helix angle or where a constant or substantially constant helix angle may be included within an overall variable helix angle flute 12. Further, while example embodiments have been described with regard to a constant or substantially constant decrease or rate of change of the helix angle (Γ) along the length or at least a portion of the length of the flute 12, in other example embodiments, the rate of change of the helix angle (Γ) may itself be variable or may have portions that are a constant rate of change and other portions that vary the rate of change of the helix angle along at least a portion of the length of the flute 12.

In the example embodiment of FIGS. 1-6, the flutes 12 divide the cutting portion 5 into a first land 14 and a second land 16. In certain example embodiments, each of the steps 8 can be defined by the step sections 10 and 11 on lands 14 and 16, respectively. For example, one step 8 can be formed by the step section 10 on land 14 and the coextensive step section 11 on land 16. The lands 14, 16 and the two flutes 12 create two cutting edges 18 and 20 that define the cutting edges of each of the steps 8. Each cutting edge 18 can include a step cutting edge 18a formed on each of the step sections 11 of land 16. Each cutting edge 20 can include a step cutting edge 20a formed on each of the step sections 10 of land 14. In certain example embodiments, the step cutting edges 18a, 20a can cooperate to cut a hole of the effective diameter. Thus, each step 8 can cut a hole of a particular effective diameter where the step 8 is defined by a step section 10 and step cutting edge 20a on land 14 and a step section 11 and step cutting edge 18a on land 16.

As used herein the term "effective diameter" means that the step cutting edges 18a, 20a of each of the steps 8 cut a hole of a predetermined effective diameter. The effective diameters differ between the steps 8. The effective diameter of each step 8 is defined by the distance between the cutting edges 18a and 20a for that step 8 (e.g., the diameter of the bit at that step 8) and can define the size of the hole drilled by that step 8. The step sections 10 and 11 can be arranged such that the smallest effective diameter step is disposed at or near the distal end or point 22 of the cutting head 5 and the largest effective diameter step is disposed near the shank 2 where the effective diameters of the steps 8 progressively increase from the distal end 22 toward the shank 2.

Figure 4:
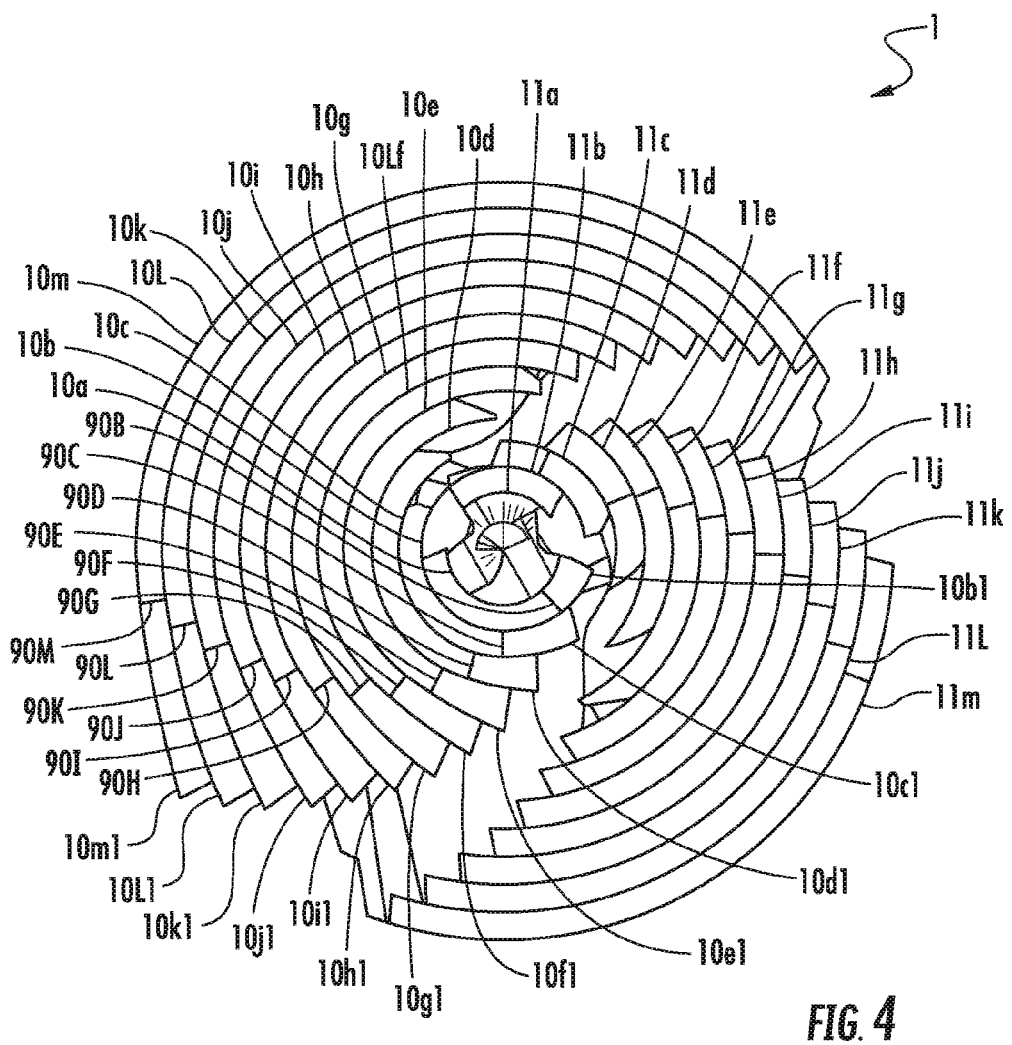
FIG. 4 is an end view of a second end of the step drill bit in in accordance with one example embodiment of the disclosure.

To generate this arrangement of the smallest effective diameter step 8 being disposed at or near the distal end or point 22 and the largest effective diameter step 8 being disposed near the shank 2, each of the step sections 10, 11 may have a progressively larger radius of curvature as the steps 8 go from near the distal end or point 22 towards the shank 2. For example, as shown in FIG. 4, the step drill bit 1 may include step sections 10a-m on land 14 and step sections 11a-m on land 16. In this example, the radius of curvature of each step section 10a-m and 11a-m may be as follows:

| 10a | 0.061 inches; | 11a | 0.065 inches; |
| 10b | 0.091 inches; | 11b | 0.093 inches; |
| 10c | 0.117 inches; | 11c | 0.124 inches; |
| 10d | 0.147 inches; | 11d | 0.163 inches; |
| 10e | 0.177 inches; | 11e | 0.185 inches; |
| 10f | 0.205 inches; | 11f | 0.218 inches; |
| 10g | 0.236 inches; | 11g | 0.247 inches; |
| 10h | 0.263 inches; | 11h | 0.277 inches; |
| 10i | 0.294 inches; | 11i | 0.310 inches; |
| 10j | 0.322 inches; | 11j | 0.340 inches; |
| 10k | 0.352 inches; | 11k | 0.371 inches; |
| 10L | 0.381 inches; | 11L | 0.401 inches; |
| 10m | 0.409 inches; and | 11m | 0.432 inches. |

These dimensions are for example purposes only. Those of ordinary skill in the art will recognize that one or more of these dimensions can be modified based on the overall size of the step drill bit 1 and the dimensions of the holes that each step is configured to cut into a material.

In certain example embodiments, one or more of the step sections 10a-m on land 14 may also include a radial relief at or adjacent to the cutting edge 20a that provides the respective step section with radius of curvature that is larger than the radius of curvature of the remaining portion of the respective step section 10a-m. This increase in radius of curvature may be a gradual increase from a transition point 90B-M along each step section 10b-m to or towards the respective cutting edge 20a of that step section 10b-m. In the example of FIG. 4, the radial relief can be as follows:

| 10b1 | 0.101 inches | 10c1 | 0.130 inches |
| 10d1 | 0.161 inches | 10e1 | 0.202 inches |
| 10f1 | 0.230 inches | 10g1 | 0.264 inches |
| 10h1 | 0.292 inches | 10i1 | 0.327 inches |
| 10j1 | 0.357 inches | 10k1 | 0.392 inches |
| 10L1 | 0.423 inches | 10m1 | 0.454 inches |

As with the dimensions for the radius of curvature for each step section above, these dimensions for the radial reliefs 10b1-10m1 are also for example purposes only. Those of ordinary skill in the art will recognize that one or more of these dimensions can be modified based on the overall size of the step drill bit 1 and the dimensions of the holes that each step is configured to cut into a material. Further, while the step sections 11a-m in FIG. 4 are not shown to include radial reliefs, this is for example purposes only. In other example embodiments, similar radial reliefs to those discussed above for step sections 10a-m may also be provided for step sections 11a-m.

In certain example embodiments, the end 22 of the step drill bit 1 can include a point or sharp end, such that the step drill bit 1 is self-starting. In other example embodiments, the point or sharp end at the end 22 can be eliminated, such that a pilot hole is drilled by another bit prior to using the step drill bit 1. As described and shown in FIGS. 1-6, one step drill bit 1 can be used to cut many different diameter holes in a material because each step section 10, 11 of each step 8 cuts a hole of a predetermined diameter. Thus, as shown, the step drill bit 1 can cut through the material where, as each step 8 cuts through the material, a progressively larger diameter hole is cut in the material.

As used herein the terms "leading" and "trailing" refer to the relative orientation of the components during operation of the step drill bit 1. Thus, a leading edge is an edge that is toward the front of the rotating step drill bit 1 and a trailing edge is an edge toward the rear of the rotating step drill bit 1. Typically, a leading edge can form a cutting edge such that the leading edge has a sharp cutting geometry for cutting the material being drilled. Likewise, a leading step is a step toward the distal end 22 of the step drill bit 1 and a trailing step is a step toward the shank 2 of the step drill bit 1.

In the example embodiment of FIGS. 1-6, each step 8 can include two step sections 10 and 11, one on each of lands 14 and 16, defining step cutting edges 20a and 18a where the two step sections 10, 11 and two cutting edges 18a, 20a of each step 8 can cooperate to cut a single hole of a predetermined diameter. Each example land 14, 16 can include a leading or cutting edge 18, 20, respectively. Each leading or cutting edge 18, 20 can define the step cutting edges 18a, 20a formed between the flutes 12 and the outer peripheral surfaces 21 of the step sections 10, 11. A transition surface 23 can be formed between the peripheral surfaces 21 of each step section 10 and 11 to provide a transition between the different diameter steps. In one example embodiment, the transition surface 23 is typically formed at an included angle with a plane through longitudinal axis A-A of less than 90 degrees to make the transition between steps during drilling relatively smooth.

Figure 5:
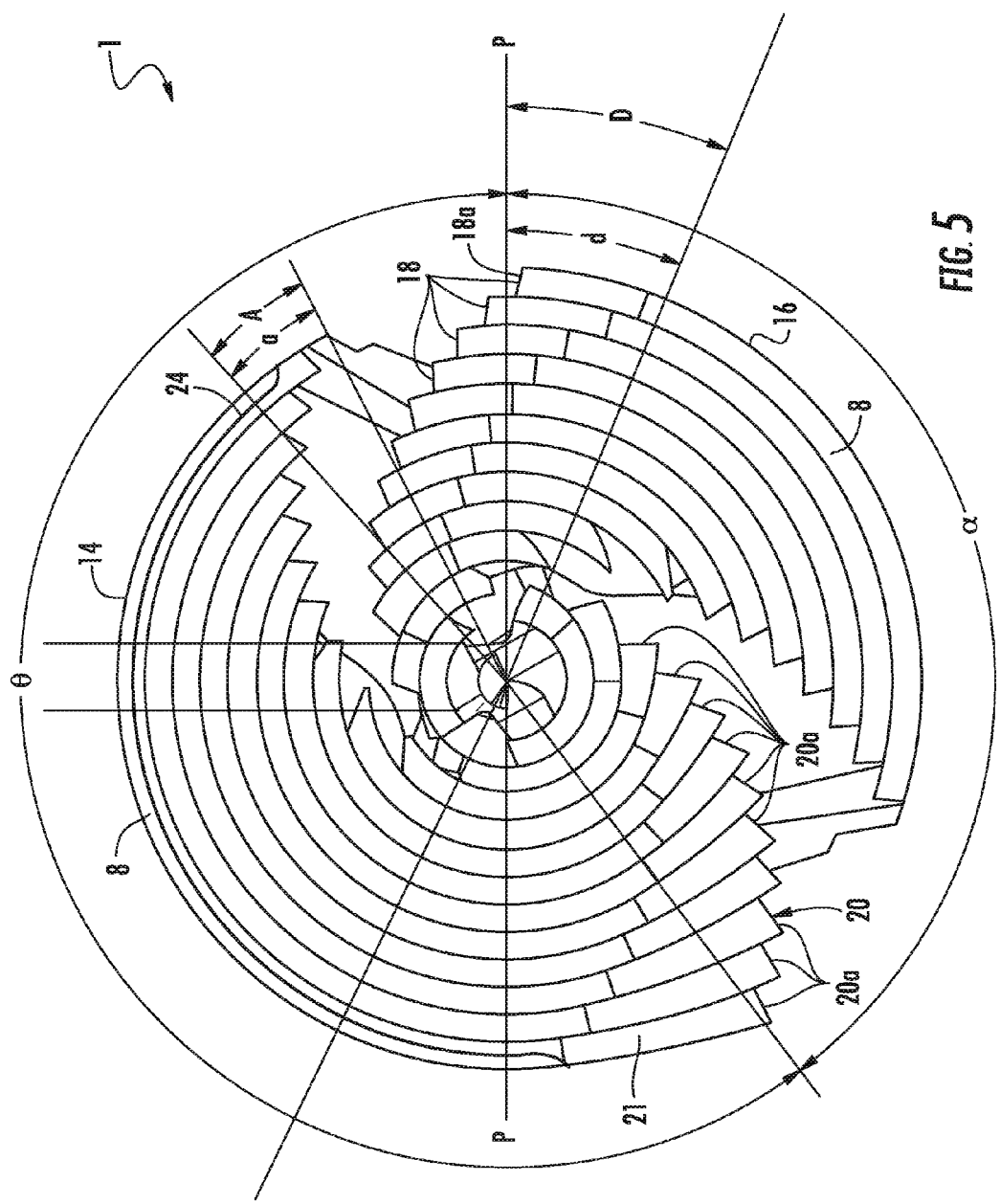
FIG. 5 is another example end view of the first end of the step drill bit in accordance with one example embodiment of the disclosure.

In certain example embodiments, the two flutes 12 and cutting edges 18, 20 are not disposed 180 degrees from one-another. Instead, the example step drill bit 1 is asymmetric in a plane perpendicular to the longitudinal axis A-A relative to a plane containing the longitudinal axis A-A. For example, FIG. 4 shows the step drill bit 1 where the plane of FIG. 4 is perpendicular to a plane containing the axis A-A. While a plane P-P is shown to illustrate the asymmetry of the step drill bit 1, a plane containing axis A-A having other angular orientations may be used to show the asymmetry of the cutting edges 18 and 20 and in certain example embodiments the cutting edges 18 and 20 are asymmetric to any plane containing axis A-A. In a symmetric two flute step drill bit (not shown) the cutting edges 18 and 20 are disposed 180 degrees from one another such that the bit would be symmetrical about a plane containing the axis A-A. In the exemplary step drill bit 1 of FIGS. 1-6, the cutting edges 18 and 20 and flutes 12 are not disposed symmetrically about the axis A-A. As shown in FIG. 5, the cutting edges 18 and 20 are disposed at a minor central angle (α) from one another. In one example embodiment, the minor central angle (α) is approximately 140 degrees. The example angle (α) is the angle between a first line drawn from axis A-A to a step cutting edge 20a on one step and a second line drawn from the axis A-A to step cutting edge 18a on the same step 8. The corresponding major central angle (Θ) between the step cutting edges 18a, 20a of the same step 8 in certain example embodiments is approximately 220 degrees. While a specific minor central angle (α) and major central angle (Θ) is provided in the example figures, the specific angular spacing between the step cutting edges 18a, 20a may vary. For example, the minor central angle (a) may be anywhere between the range of approximately 120 degrees to approximately 160 degrees and the major central angle (Θ) may be anywhere between approximately 200 degrees and approximately 240 degrees.

In the example embodiment of FIGS. 1-6, the two flutes 12 are substantially identical. However, in other example embodiments the flutes 12 may have different shapes and/or sizes. Because the two flutes 12 are approximately the same size and shape in the example embodiment, the lands 14 and 16 extend for different central angles. As shown, land 14 extends for a greater central angle than land 16 and is larger than land 16.

Another way to define the asymmetry of the step drill bit 1 is by the arc length of the circumference of the step drill bit 1 between the step cutting edges 18*a*, 20*a* of each step 8. In one example embodiment the minor distance between the step cutting edges 18*a*, 20*a* can be anywhere within the range of approximately 28 percent to approximately 45 percent of the circumference of the step defined by the step cutting edges 18*a*, 20*a* and the major distance between the step cutting edges 18*a*, 20*a* can be anywhere within the range of approximately 55 percent to approximately 72 percent of the circumference of the step 8 defined by the step cutting edges 18*a*, 20*a*. In certain example embodiments, the central angle and arc length are related for any given circle diameter such that the circumferential distances described herein may be described in terms of the arc length and/or central angle.

Use of the asymmetrical cutting edges 18 and 20 as described in the example embodiments herein may help create a three-point contact between each step 8 of the step drill bit 1 and the side wall of the hole being cut. For example, contact can be made with the side wall of the hole being cut at the first cutting edge 18, the second cutting edge 20 and a rubbing portion 24 formed on one of the lands 14, 16. In certain example embodiments, the three points of contact can help stabilize the step drill bit 1 as the hole is drilled, thereby resulting in a truer round hole as will be explained.

It will be understood that when a twist bit rather than a step drill bit is used to cut a relatively deep hole, the side wall of the hole serves to stabilize the twist bit as the twist bit drills into the material. With a step drill bit, such as the example step drill bit 1 of FIGS. 1-6, because the hole being drilled can be relatively shallow, the step drill bit 1 is not stabilized by the engagement of a significant length of the bit with the side wall of the hole being drilled. The use of a three-point contact, as described herein, can stabilize the step drill bit 1 even when drilling shallow holes in thin-walled material, such as those materials with a wall thickness of less than ¼ inch. Double-flute symmetrical step drill bits provide two cutting edges spaced 180 degrees from one another. However, double-flute symmetrical step bits only have two points of contact and are not stabilized such that the double-flute symmetrical step drill bits are more difficult to control during drilling. As a result, double-flute symmetrical step drill bits tend to "travel" as the hole is cut causing non-round holes. Double-flute symmetrical step drill bits also generate a significant amount of vibration and chatter in the step drill bit. On the other hand, by providing an asymmetric double-flute step drill bit 1, as described herein, the drill bit 1 has the cutting advantages of a symmetric double-fluted bit but that is easier to control during drilling and that drills a more truly round hole.

The third point of contact may be made by providing a rubbing surface 24 on each of the steps 8. The rubbing surface 24 contacts the side wall of the hole being cut, in addition to the two cutting edges 18, 20, to create a asymmetric double-flute step drill bit 1 with three points of contact. In one example embodiment, the rubbing surface 24 is created by using a negative or neutral relief at or near the trailing edge of the larger land 14. As shown in the figures, each step 8 of the step drill bit 1 can include a positive radial relief that extends from the step cutting edges 18*a*, 20*a* toward the trailing edge of each step 8 that may extend for an arc length D or central angle d from the step cutting edges 18*a*, 20*a*. With a positive radial relief the radius of each step section 10, 11 can be gradually reduced from the cutting edge 18*a*, 20*a* toward the trailing edge of the step section to provide a space S between the peripheral surface 21 of the step sections and the side wall of the hole being cut. The use of the positive radial relief can minimize interference and friction between the peripheral surface 21 of the step 8 and the edge of the hole as the step drill bit 1 rotates.

In certain example embodiments, the rubbing surface 24 may be provided by an area of negative or neutral relief on each step section 11 of land 14 where the radius of each step 8 of land 14 gradually increases until the peripheral surface 21 of each step 8 extends approximately the same radius, or a slightly smaller radius, as the radius to the step cutting edge 18*a* for that step. The area of negative or neutral relief may be provided in for a small arc length A, or a small center angle α. In certain example embodiments, the radius, from axis A-A to the rubbing surface 24, can be the same or slightly less than the radius of the cutting edges 18, 20 without creating undue interference with the wall of the hole being cut. Further, the maximum radius from the axis A-A to the rubbing surface 24 can be selected to be large enough that the rubbing surface 24 is in close proximity to the edge of the hole being cut (the effective diameter) such that the rubbing surface 24 provides support for the step drill bit 1 and the minimum radius of the rubbing portion 24 can be selected to be small enough that the rubbing surface 24 does not bind on or create undue friction with the edge of the hole being cut. In certain example embodiments, the radius to the rubbing portion 24 is approximately equal to or slightly less that the effective diameter of the step 8. As shown in FIGS. 1-5, three points of contact are created between the side wall of the hole being cut H and each step 8 of the step drill bit 1. The first point of contact is at cutting edge 20, the second point of contact is at cutting edge 18 and the third point of contact is at rubbing surface 24. The three points of contact stabilize the step drill bit 1 during drilling to provide a more truly circular hole.

While the rubbing surface 24 is shown in FIG. 5 as being located at the trailing end of the larger land 14 the rubbing surface may be located anywhere along the length of the land 14 in other example embodiments. In certain example embodiments, the rubbing surface 24 may be formed other than by using a negative or neutral relief provided that the rubbing surface 24 is formed approximately on the effective diameter of the step 8 and has a shape that does not interfere with the rotation of the step drill bit 1. In certain example embodiments, a rubbing surface may be formed on the smaller land 16. By configuring the step drill bit 1 such that the cutting edges 18, 20 are asymmetrically arranged relative to one another, the center angle between the cutting edges 18, 20 is greater than 180 degrees in one direction and less than 180 degrees in the opposite direction (or the arc length between the cutting edges is greater than 50% of the circumference in one direction and less than 50% of the circumference in the opposite direction). In certain example embodiments, the rubbing surfaces 24 may be arranged on the larger land 14 such that the three points of contact may be relatively evenly disposed about the periphery of the step drill bit 1. While the two cutting edges 18, 20 and the rubbing surface 24 may not necessarily be spaced 120 degrees from one another, the contact points may be approximately evenly distributed about the periphery of the step drill bit 1 by asymmetrically arranging the cutting edges

18, 20. For example, in the embodiments shown in FIGS. 1-6, the minor central angle (α) between the cutting edges 18, 20 is approximately 140 degrees and the rubbing surface 24 is disposed generally in the middle of the 220 degree major central angle (Θ), although the rubbing surfaces need not be exactly in the center of the major diameter. By arranging the cutting edges 18, 20 asymmetrically and extending the trailing edge of the one land, for example land 14, to extend to approximately a midpoint of the major central angle (Θ) the three points of contact may be relatively evenly spaced from one another.

As previously explained, in certain example embodiments, the step sections 10 and 11 can be formed with a positive radial relief such that behind the step cutting edges 18a, 20a the peripheral surfaces 21 of the step sections 10 and 11 extend inwardly away from the side wall of the hole being cut such that an increasingly large space or gap S is provided between the peripheral wall of the step 8 and the side wall of the hole being cut to thereby minimize interference and friction between the step portion and the wall of the hole. The radial relief may extend for an arc length D (or center angle d) from the step cutting edges 18a, 20a at which point the peripheral wall 21 of the step sections 10 and 11 is formed as an arc of a circle such that the size of the space S does not continue to increase from the end of the radial relief section towards the end of the land.

Figure 2:
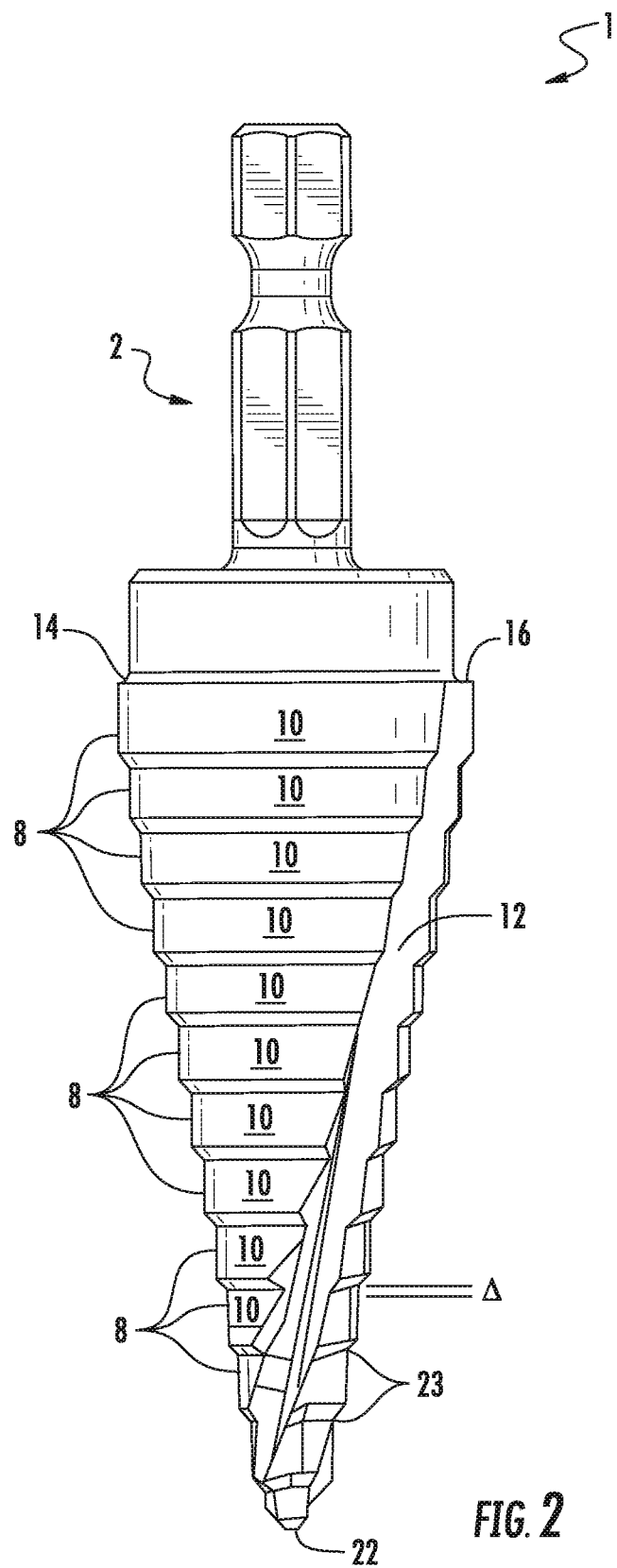
FIG. 2 is a plan view of the step drill bit in accordance with one example embodiment of the disclosure.

The step sections 10 and 11 also may be provided with an axial relief. To create the axial relief, each step section 10 and 11 may be configured to have a helical pitch from the step cutting edge 18a, 20a for a distance along the circumference of the step, as shown in FIG. 2. The axial relief may be defined as a linear distance Δ between a plane that is perpendicular to the longitudinal axis A-A at any point along the circumference of the step drill bit 1. The axial relief may extend for an arc length (or center angle) from the step cutting edges 18a, 20a. For example, the axial relief may be anywhere in the range of between approximately 2 degrees to approximately 15 degrees and in some example embodiments may be approximately 5 degrees, relative to a plane that is perpendicular to the longitudinal axis A-A and may extend for a central angle of anywhere in the range of between approximately 5 degrees to approximately 30 degrees from the cutting edges 18a, 20a, and in certain example embodiments may extend for a central angle of approximately 15 degrees. The axial relief may be a change in distance of anywhere in the range of between approximately 0.005 inches to approximately 0.05 inches A, and in certain example embodiments may be approximately 0.05 inches, and may extend for a center angle (E of FIG. 3) of anywhere in the range of between approximately 5 degrees to approximately 30 degrees from the cutting edges 18a, 20a, and in some embodiments may extend for a central angle of approximately 15 degrees.

Figure 3:
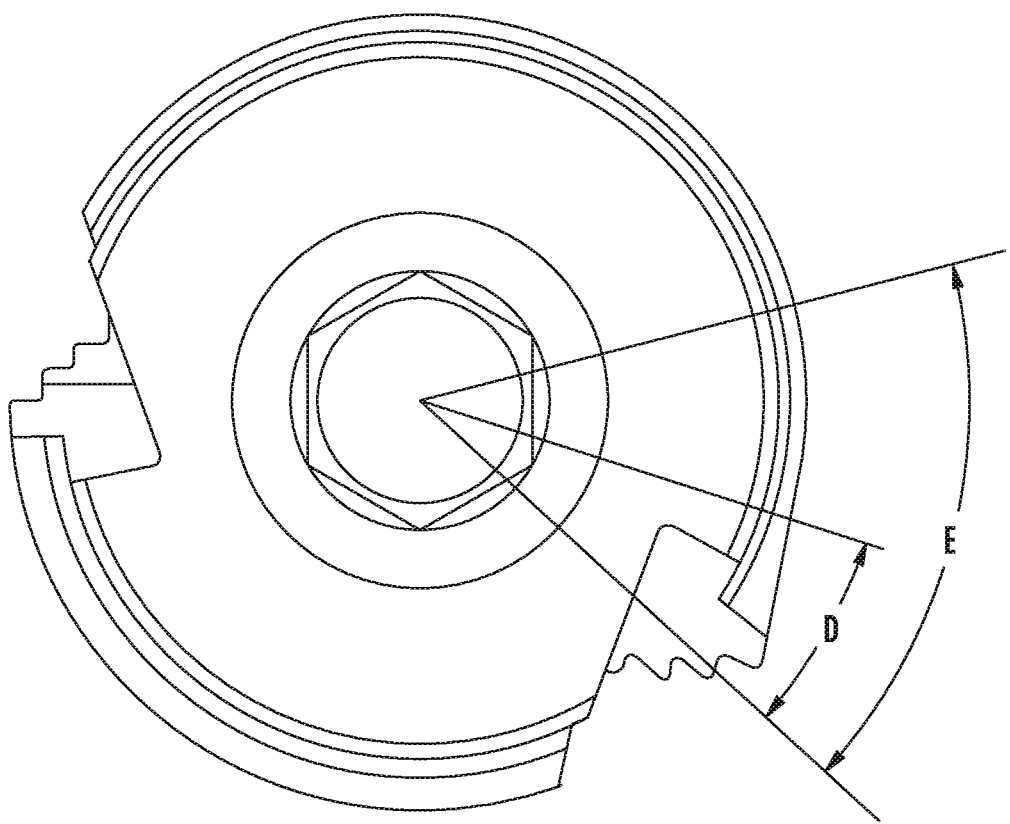
FIG. 3 is an end view of a first end of the step drill bit in accordance with one example embodiment of the disclosure.

In one example embodiment for the step drill bit 1, the distance (D) the radial relief extends from the cutting edges 18a, 20a and the distance (E) the axial relief extends from the cutting edges 18a, 20a may be decoupled such that the radial relief and the axial relief extend from the cutting edges at different central angles or arc lengths as shown in FIG. 3. In certain example embodiments, the radial relief may extend for a relatively short circumferential distance (D) while the axial relief may extend for a much greater circumferential distance (E) such that the distance the radial relief extends is less than the distance the axial relief extends. Extending the radial relief for a relatively short arc length can provide a more stable step drill bit 1, because the gap S does not increase over a large arc length of the step 8 while extending the axial relief for a relatively long distance provides a faster cutting bit. The distances the axial and radial reliefs extend from the cutting edges may be selected based on the particular application. Moreover, the amount of radial relief, the amount of axial relief and the distances the reliefs extend from the cutting edges 18a, 20a may vary from step to step such that different steps 8 have different axial and radial reliefs.

Although specific embodiments have been shown and described herein, those of ordinary skill in the art appreciate that any arrangement, which is calculated to achieve the same purpose, may be substituted for the specific example embodiments disclosed. This application is intended to cover any adaptations or variations of the example embodiments disclosed herein. The following claims are in no way intended to limit the scope of the disclosure to the specific embodiments described herein. While the above description contains many specifics, these specifics should not be construed as limitations on the scope of the disclosure, but merely as exemplifications of the disclosed embodiments. Those skilled in the art will envision many other possible variations that are within the scope of the disclosure.

In example embodiments of the disclosure there may be an apparatus. The apparatus can be a step drill bit. The step drill bit can include a cutting head defining a longitudinal axis extending from a first tip end to a distal shank end of the cutting head. The cutting head of the step drill bit can include a plurality of steps, each of the plurality of steps having a different effective diameter. The step drill bit can also include at least one flute in the cutting head. Each of the at least one flute can define an elongated groove in the cutting head. Each of the at least one flute can also have a length, a first flute end disposed adjacent the first tip end, and a distal second flute end extending the length toward the shank end along a helical path about the longitudinal axis of the cutting head. The helical path of the each of the at least one flute can also include a variable helix angle relative to the longitudinal axis. The step drill bit can also include a plurality of cutting edges formed in the cutting head. Each of the plurality of cutting edges can be disposed along a corresponding one of the plurality of steps.

The variable helix angle of the step drill bit can also include a first helix angle at the first flute end and a second helix angle at the second flute end. The first helix angle can be greater than the second helix angle. The step drill bit can also be configured such that the variable helix angle reduces at approximately a constant rate from the first helix angle to the second helix angle along the length of the flute. The step drill be can be configured such that the variable helix angle varies at a variable rate from the first helix angle to the second helix angle along the length of the flute.

The variable helix angle of the step drill can include a first portion that includes the first helix angle, a second portion that includes the second helix angle, and a third portion disposed between the first portion and the second portion. In one example, the helix angle for the first portion of the variable helix angle can be constant, the helix angle for the second portion of the variable helix angle can be constant, and the helix angle for the third portion of the variable helix angle reduces at approximately a constant rate between the first portion and the second portion.

The variable helix angle of the step drill can include a first portion that includes the first helix angle, a second portion that includes the second helix angle, and a third portion disposed between the first portion and the second portion. In one example, the helix angle for the first portion of the variable helix angle can reduce at approximately a first constant rate, the helix angle for the second portion of the variable helix angle can reduce at approximately a second constant rate, and the helix angle for the third portion of the variable helix angle is approximately constant between the first portion and the second portion. In certain examples, the first constant rate is the same as the second constant rate while in other examples the first constant rate is less than or greater than the second constant rate.

The at least one flute of the step drill bit can include a first flute and a second flute that divide the cutting head into a first land and a second land. In one example the first land extends for a greater center angle than the second land. The first land of the step drill bit can also include a first plurality of steps and the second land of the step drill bit can include a second plurality of steps. In one example, each of the first plurality of steps of the first land can include a first cutting edge and a first trailing edge formed in the first land. Each of the second plurality of steps in the second land can include a second cutting edge and a second trailing edge formed in the second land. The step drill bit can also include a negative or neutral radial relief provided between at least one of the first cutting edge and the first trailing edge of the first land or the second cutting edge and the second trailing edge of the second land in at least a portion of the first plurality of steps of the first land or the second plurality of steps of the second land.

In other example embodiments, an apparatus can be provided that includes a step drill bit. The step drill bit can include a cutting head. The cutting head can define a longitudinal axis that can extend from a first tip end to a distal shank end of the cutting head. The cutting head can also include a plurality of steps. Each of the steps of the cutting head can have a different effective diameter. The apparatus can also include a first flute and a second flute on the step drill bit. Each flute can define an elongated groove in the cutting head having a length and having a first flute end disposed adjacent the first tip end and a distal second flute end extending the length toward the shank end along a helical path about the longitudinal axis of the cutting head. At least a portion of each flute can extend along the helical path at a variable helix angle relative to the longitudinal axis. The example first flute and second flute can divide the cutting head into a first land and a second land. The apparatus can also include a plurality of first cutting edges and a plurality of second cutting edges formed in the cutting head of the step drill bit. Each of the plurality of first and second cutting edges can be disposed along a corresponding one of the plurality of steps. The first land and the first flute can create the first plurality of cutting edges and the second land and the second flute can create the second plurality of cutting edges.

In certain examples, each of the first plurality of cutting edges and the second plurality of cutting edges can be disposed at a center angle relative to one another of less than 180 degrees. In certain examples, each of the first plurality of cutting edges can be disposed at a center angle of anywhere in the range of between approximately 120 degrees to approximately 160 degrees relative to each corresponding one of the second plurality of cutting edges along the same one of the plurality of steps. In certain examples, the first land extends for a greater center angle than the second land along the same one of the plurality of steps.

In certain examples, the plurality of steps are configured to create three points of contact between each of the plurality of steps and a side wall of a hole being cut. The apparatus can be configured such that the variable helix angle for the first flute can include a first helix angle at the first flute end of the first flute and a second helix angle at the second flute end of the first flute, wherein the first helix angle is greater than the second helix angle. In certain examples, the variable helix angle can reduce at a constant rate from the first helix angle to the second helix angle along the length of the first flute. In certain examples, the apparatus can be configured such that a second variable helix angle for the second flute can include a third helix angle at the first flute end of the second flute and a fourth helix angle at the second flute end of the second flute. In certain examples, the third helix angle is greater than the fourth helix angle. The apparatus can be configured such that the second variable helix angle for the second flute can reduce at a constant rate from the third helix angle to the fourth helix angle. In certain examples, the third helix angle is a different angle from the first helix angle and the fourth helix angle is a second different angle from the second helix angle. The apparatus can be configured such that the variable helix angle varies at a variable rate from the first helix angle to the second helix angle along the length of the first flute.

What is claimed is:

1. A step drill bit comprising:
   a cutting head defining a longitudinal axis extending from a first tip end to a distal shank end of the cutting head, the cutting head comprising a plurality of steps, each of the plurality of steps having a different effective diameter;
   at least one flute in the cutting head, each flute defining an elongated groove in the cutting head having a length and having a first flute end disposed adjacent the first tip end and a distal second flute end extending the length toward the shank end along a helical path about the longitudinal axis of the cutting head at a variable helix angle relative to the longitudinal axis
   wherein the variable helix angle comprises:
      a first portion comprising a first helix angle at the first flute end, wherein the first portion of the variable helix angle reduces at approximately a first constant rate;
      a second portion comprising a second helix angle at the second flute end, wherein the second portion of the variable helix angle reduces at approximately a second constant rate and wherein the first helix angle is greater than the second helix angle; and
      a third portion disposed between the first portion and the second portion, wherein the third portion of the variable helix angle is approximately a constant helix angle; and
   a plurality of cutting edges formed in the cutting head, each of the plurality of cutting edges disposed along a corresponding one of the plurality of steps.

2. The step drill bit of claim 1, wherein the variable helix angle varies at a variable rate from the first helix angle to the second helix angle along the length of the flute.

3. The step drill bit of claim 1, wherein the at least one flute comprises a first flute and a second flute divide the cutting head into a first land and a second land.

4. The step drill bit of claim 3, wherein the first land extends for a greater center angle than the second land.

5. The step drill bit of claim 3, wherein the first land comprises a first plurality of steps and the second land comprises a second plurality of steps,
   each of the first plurality of steps of the first land comprising a first cutting edge and a first trailing edge formed in the first land;

each of the second plurality of steps in the second land comprising a second cutting edge and a second trailing edge formed in the second land;

a negative or neutral radial relief provided between at least one of the first cutting edge and the first trailing edge of the first land or the second cutting edge and the second trailing edge of the second land in at least a portion of the first plurality of steps of the first land or the second plurality of steps of the second land.

6. An apparatus comprising
a step drill bit comprising:
  a cutting head defining a longitudinal axis extending from a first tip end to a distal shank end of the cutting head, the cutting head comprising a plurality of steps, each of the plurality of steps having different effective diameters;
  a first flute and a second flute, each flute defining an elongated groove in the cutting head having a length and having a first flute end disposed adjacent the first tip end and a distal second flute end extending the length toward the shank end along a helical path about the longitudinal axis of the cutting head at a variable helix angle relative to the longitudinal axis, wherein the variable helix angle for the first flute comprises a first helix angle at the first flute end of the first flute and a second helix angle at the second flute end of the first flute, wherein the first helix angle is greater than the second helix angle, wherein the variable helix angle reduces at a constant rate from the first helix angle to the second helix angle along the length of the first flute, wherein a second variable helix angle for the second flute comprises a third helix angle at the first flute end of the second flute and a fourth helix angle at the second flute end of the second flute, wherein the third helix angle is greater than the fourth helix angle, and wherein the first flute and the second flute divide the cutting head into a first land and a second land; and
  a plurality of first cutting edges and a plurality of second cutting edges formed in the cutting head, each of the plurality of first and second cutting edges disposed along a corresponding one of the plurality of steps, wherein the first land and the first flute create the first plurality of cutting edges and wherein the second land and the second flute create the second plurality of cutting edges.

7. The apparatus of claim 6, wherein each of the first plurality of cutting edges and the second plurality of cutting edges are disposed at a center angle relative to one another of less than 180 degrees.

8. The apparatus of claim 6, wherein each of the first plurality of cutting edges is disposed at a center angle of between approximately 120 and 160 degrees relative to each corresponding one of the second plurality of cutting edges along the same one of the plurality of steps.

9. The apparatus of claim 6, wherein the first land extends for a greater center angle than the second land.

10. The apparatus of claim 6, wherein the plurality of steps are configured to create three points of contact between each of the plurality of steps and a side wall of a hole being cut.

11. The apparatus of claim 6, wherein the second variable helix angle for the second flute reduces at a constant rate from the third helix angle to the fourth helix angle.

12. The apparatus of claim 6, wherein the third helix angle is a different angle from the first helix angle and wherein the fourth helix angle is a second different angle from the second helix angle.

* * * * *